(12) United States Patent
Ogata et al.

(10) Patent No.: US 12,431,299 B2
(45) Date of Patent: Sep. 30, 2025

(54) ELECTROLYTIC CAPACITOR INCLUDING AN ANODE BODY HAVING NON-UNIFORM DENSITY

(71) Applicant: Panasonic Intellectual Property Management Co., Ltd., Osaka (JP)

(72) Inventors: Norihiko Ogata, Saga (JP); Yuma Yano, Saga (JP); Kazuhide Gotou, Saga (JP); Yukiyasu Sugihara, Aichi (JP); Masayuki Hogiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 158 days.

(21) Appl. No.: 18/171,398

(22) Filed: Feb. 20, 2023

(65) Prior Publication Data

US 2023/0207224 A1 Jun. 29, 2023

Related U.S. Application Data

(63) Continuation of application No. PCT/JP2021/007188, filed on Feb. 25, 2021.

(30) Foreign Application Priority Data

Sep. 25, 2020 (JP) .................................. 2020-161345

(51) Int. Cl.
*H01G 9/15* (2006.01)
*H01G 9/028* (2006.01)
*H01G 9/052* (2006.01)

(52) U.S. Cl.
CPC .............. *H01G 9/15* (2013.01); *H01G 9/028* (2013.01); *H01G 9/0525* (2013.01)

(58) Field of Classification Search
CPC ......... H01G 9/15; H01G 9/028; H01G 9/0525
See application file for complete search history.

(56) References Cited

U.S. PATENT DOCUMENTS

| | | | | |
|---|---|---|---|---|
| 3,818,286 A | * | 6/1974 | Ganz ...................... | H01G 9/052 361/529 |
| 4,945,452 A | * | 7/1990 | Sturmer .................. | H01G 9/052 29/25.03 |

(Continued)

FOREIGN PATENT DOCUMENTS

| | | |
|---|---|---|
| JP | 1-113328 U | 7/1989 |
| JP | 6-252010 | 9/1994 |

(Continued)

OTHER PUBLICATIONS

International Search Report of PCT application No. PCT/JP2021/007188 dated May 11, 2021.

*Primary Examiner* — Timothy J. Dole
*Assistant Examiner* — Daniel M Dubuisson
(74) *Attorney, Agent, or Firm* — Rimon P.C.

(57) ABSTRACT

An electrolytic capacitor includes a capacitor element that includes a porous anode body including an anode base body and a dielectric layer formed on a surface of the anode base body, and a solid electrolyte layer that covers at least a part of the dielectric layer. The anode body includes a plurality of principal surfaces, and at least a part of a surface layer of at least one principal surface of the plurality of principal surfaces of the anode body is denser than an inside of the anode body.

16 Claims, 4 Drawing Sheets

(56) References Cited

U.S. PATENT DOCUMENTS

| | | | |
|---|---|---|---|
| 5,483,415 A | | 1/1996 | Nakamura et al. |
| 5,486,977 A | * | 1/1996 | Hasegawa .............. H01G 2/065 361/523 |
| 2004/0016978 A1 | | 1/2004 | Yano et al. |
| 2008/0239631 A1 | * | 10/2008 | Fujita ...................... H01G 9/15 29/25.42 |
| 2008/0299335 A1 | | 12/2008 | Poltorak et al. |
| 2008/0299371 A1 | * | 12/2008 | Poltorak .................. H01G 9/15 428/220 |
| 2012/0120553 A1 | * | 5/2012 | Han ......................... H01G 9/15 29/25.03 |
| 2017/0330692 A1 | * | 11/2017 | Tochio ..................... H01G 9/15 |
| 2018/0114640 A1 | | 4/2018 | Inoue et al. |
| 2018/0204680 A1 | * | 7/2018 | Guerrero ................. H01G 9/042 |
| 2019/0304703 A1 | * | 10/2019 | King ..................... H01G 9/0029 |

FOREIGN PATENT DOCUMENTS

| | | | |
|---|---|---|---|
| JP | H07130582 A | * | 5/1995 |
| JP | 2004-349658 A | | 12/2004 |
| JP | 2006-080266 | | 3/2006 |
| JP | 2008-022041 | | 1/2008 |
| JP | 2009-182157 | | 8/2009 |
| JP | 2010165701 A | * | 7/2010 |
| JP | 2014-167985 | | 9/2014 |
| WO | 2017/026295 | | 2/2017 |

* cited by examiner

ELECTROLYTIC CAPACITOR INCLUDING AN ANODE BODY HAVING NON-UNIFORM DENSITY

BACKGROUND

1. Technical Field

The present disclosure relates to an electrolytic capacitor and a method for producing an electrolytic capacitor.

2. Description of the Related Art

Electrolytic capacitors are mounted on various electronic devices because of small equivalent series resistance (ESR) and excellent frequency characteristics. An electrolytic capacitor usually includes a capacitor element including an anode part and a cathode part. The anode part includes a porous anode body, and a dielectric layer is formed on a surface of the anode body. The dielectric layer is in contact with an electrolyte. As the electrolyte, there is an electrolytic capacitor using a solid electrolyte such as a conductive polymer (for example, Unexamined Japanese Patent Publication No. 2009-182157).

SUMMARY

An electrolytic capacitor according to an aspect of the present disclosure includes a capacitor element. The capacitor element includes a porous anode body including an anode base body and a dielectric layer disposed on a surface of the anode base body, and a solid electrolyte layer that covers at least a part of the dielectric layer. The anode body includes a plurality of principal surfaces. At least a part of a first surface layer of at least one principal surface of the plurality of principal surfaces of the anode body is denser than an inside of the anode body.

Another aspect of the present disclosure is a method producing an electrolytic capacitor including a capacitor element. The capacitor element includes a porous anode body including an anode base body and a dielectric layer formed on a surface of the anode base body, and a solid electrolyte layer that covers at least a part of the dielectric layer. The method of the present disclosure includes a step of preparing an anode base material including a bound body of metal powder, a step of sintering the anode base material, a step of obtaining the anode body including the anode base body and the dielectric layer by performing an anodizing treatment on the anode base material after sintering, and covering at least a part of the dielectric layer with the solid electrolyte layer. The anode base material includes a plurality of principal surfaces. The method further includes increasing a density of at least a partial region of at least one principal surface of the plurality of principal surfaces of the anode base material.

By the electrolytic capacitor or the method for producing an electrolytic capacitor of the present disclosure, the reliability of the electrolytic capacitor can be improved.

DETAILED DESCRIPTIONS OF EMBODIMENTS

[Electrolytic capacitor]

Figure 1:
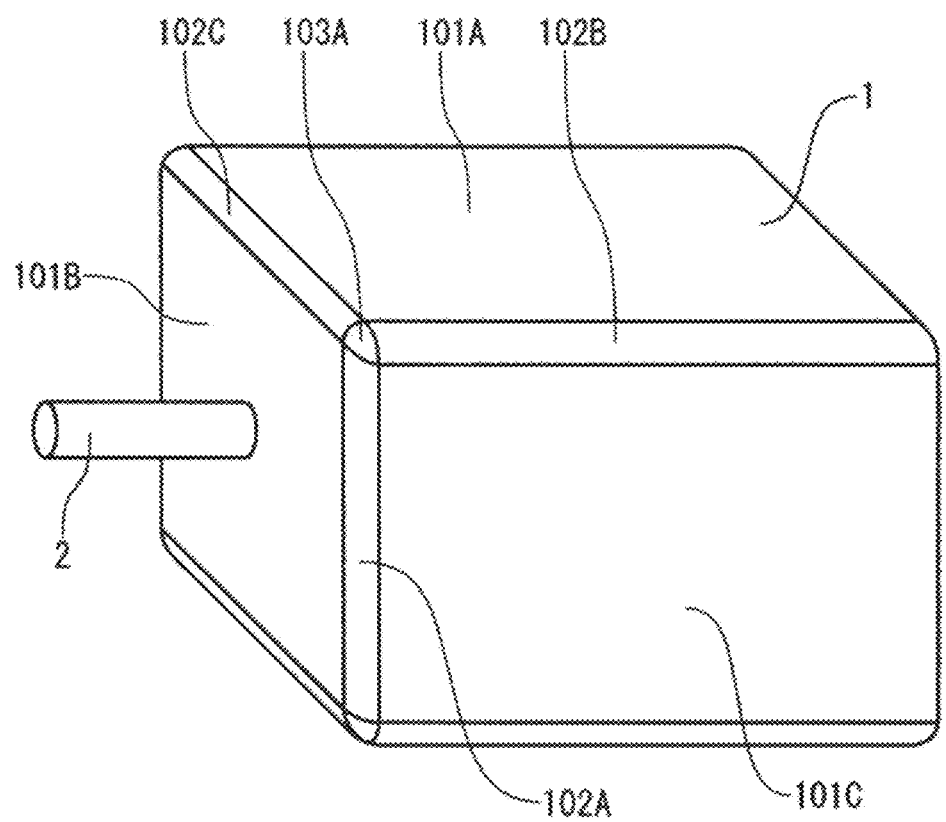
FIG. 1 is a perspective view schematically illustrating a shape of an anode body used in an electrolytic capacitor according to an exemplary embodiment of the present disclosure.

An electrolytic capacitor according to an exemplary embodiment of the present disclosure includes a capacitor element. The capacitor element includes a porous anode body including an anode base body and a dielectric layer formed on a surface of the anode base body, and a solid electrolyte layer that covers at least a part of the dielectric layer. The anode body includes a plurality of principal surfaces. At least a part of surface layer X of the principal surface of the anode body is denser than inside Y of the anode body.

The anode body usually has a rectangular parallelepiped shape. In this case, the plurality of principal surfaces refer to surfaces of the rectangular parallelepiped. The surface layer of the anode body refers to a region having a depth of 3 μm or less from the surface of the anode body. The inside of the anode body refers to a region having a depth of 20 μm or more from the surface of each principal surface of the anode body.

In a case where the anode body has the plurality of principal surfaces, a side portion connecting two principal surfaces of the plurality of principal surfaces and/or a vertex portion connecting three or more principal surfaces of the plurality of principal surfaces may be formed. The side portion refers to a side where two principal surfaces of the anode body intersect and a region near the side. The vertex portion refers to a vertex where three principal surfaces of the anode body intersect and a region near the vertex. Here, the side portion and the vertex portion are collectively referred to as "corner portions".

The dielectric layer is usually formed by performing an anodizing treatment on an anode base material and oxidizing a surface of the anode base material . Thus, properties of the dielectric layer formed by anodization are affected by a surface state of the anode base material before the anodizing treatment.

The anode base material before the anodizing treatment can be produced, for example, by inserting a metal powder in a mold, pressing and sintering the metal powder. In this case, metal fine particles are exposed on the principal surface of the anode base material, and the anode base material is not flat as viewed microscopically, has large surface roughness, and is likely to have a shape having irregularities. In particular, in the side portion connecting two principal surfaces of the anode base material and the vertex portion connecting three or more principal surfaces, the surface of the anode base material is not flat as viewed microscopically, has large surface roughness, and is likely to have a shape having irregularities. When the dielectric layer is grown by the anodizing treatment in this state, a defect is likely to occur in the dielectric layer in the irregularity portion. When the defect occurs in the dielectric layer, a path through which a current flows between a solid electrolyte and a valve metal via the defect portion occurs, and a leakage current may increase.

Further, the anode body after the anodizing treatment is fragile and is likely to be broken because the anode body after the anodizing treatment, which has an outer shape reflecting an outer shape of the anode base material before the anodizing treatment, is porous. In particular, the corner portion of the anode body has lower mechanical strength than a portion other than the corner portion, and thermal stress is likely to be concentrated in the corner portion. When the porous part is damaged, the dielectric layer covering the porous part may be damaged. Due to the damage of the dielectric layer, the leakage current may increase.

In the electrolytic capacitor of the present exemplary embodiment, since the surface layer of the principal surface of the anode base material before the anodizing treatment is densely formed, it is possible to reduce a defect during the anodization of the dielectric layer which are caused when the dielectric layer is formed by the anodizing treatment. As a result, the leakage current can be reduced. Further, the mechanical strength of the dielectric layer can be enhanced. Accordingly, the damage of the dielectric layer after the anodization can be suppressed. As a result, the increase in the leakage current is suppressed.

With respect to the denseness of the surface layer of the principal surface of the anode body, porosity P1 of surface layer X of the principal surface of the anode body is preferably between 0.02 times and 0.7 times, inclusive, porosity P2 of inside Y of the anode body. When porosity P1 is less than or equal to 0.7 times porosity P2, surface layer X is sufficiently dense with respect to inside Y, the damage of the dielectric layer after the anodization is suppressed, and the increase in the leakage current is suppressed. Porosity P1 is more preferably less than or equal to 0.5 times porosity P2, and may be still more preferably less than or equal to 0.3 times. On the other hand, when porosity P1 is 0.02 times or more porosity P2, the solid electrolyte layer covering the dielectric layer is easily formed in pores of the anode body. Porosity P1 is more preferably 0.05 times or more porosity P2, and may be still more preferably 0.1 times or more.

The electrolytic capacitor may contain a small amount of aluminum caused by a production step near the surface layer of the dielectric layer or the anode body. Note that the term "small amount" means that a content proportion of aluminum in the dielectric layer is between 0.001 wt % and 10 wt %, inclusive, in a region where a depth from the surface of the anode body is less than or equal to 1 μm. The content proportion of aluminum in the dielectric layer may be between 0.01 wt % and 10 wt %, inclusive.

At least a part of the corner portion of the anode body may have a curved surface shape or a chamfered shape. At least a part of the corner portion has a curved surface or is chamfered, and thus, the damage of the dielectric layer at the corner portion is suppressed. As a result, an electrolytic capacitor having a small leakage current can be realized. Thus, the reliability of the electrolytic capacitor can be enhanced. In addition to the surface layer of the principal surface of the anode body, the corner portions are also preferably densified.

The meaning that at least a part of the corner portion has the curved surface shape is not limited to a case where a cross-sectional shape of the corner portion is a curve shape. For example, the cross-sectional shape of the corner portion may be a polygonal line having a plurality of obtuse angles. In a case where the cross-sectional shape is a convex shape and in the cross-sectional shape, a straight line corresponding to one principal surface and a straight line corresponding to another adjacent principal surface are connected via at least one straight line and/or curve, it can be said that the corner portion has a curved surface shape or a chamfered shape. In other words, the description that the corner portion has the curved surface shape or the chamfered shape also means that the corner portion does not have a pointed region of 90° or less in the cross-sectional shape of the corner portion in a cross section perpendicular to two adjacent principal surfaces.

The solid electrolyte layer is formed to cover the dielectric layer. In a case where the anode body has no curved surface at the corner portion, the solid electrolyte layer at the corner portion is likely to be formed thin. In particular, in a case where the solid electrolyte layer contains a conductive polymer and the conductive polymer is formed by chemical polymerization, a thickness of the solid electrolyte layer is likely to be thin at the corner portion. However, at least a part of the corner portion is formed in a curved surface, and thus, thinning of the solid electrolyte layer at the corner portion can be suppressed. As a result, the solid electrolyte layer can be formed with a uniform thickness. Accordingly, the electrolytic capacitor becomes strong against external stress, and can suppress the increase in the leakage current and occurrence of short circuit failure. Further, a withstand voltage improves.

Surface layer Z of the corner portion adjacent to surface layer X may be denser than surface layer X and inside Y. Surface layer Z of the corner portion is densely formed, and thus, the mechanical strength of the corner portion can be further enhanced. Thus, an effect of suppressing the increase in the leakage current through the corner portion can be enhanced.

Even if the corner portion does not have the curved surface and is not chamfered, sufficient mechanical strength of the corner portion can be obtained because surface layer Z is densely formed. Thus, the increase in the leakage current through the corner portion can be suppressed. Meanwhile, it is preferable that at least a part of the portion including surface layer Z has a curved surface shape or a chamfered shape because the leakage current can be further suppressed.

The description that surface layer Z is denser than surface layer X and inside Y means that porosity P3 of surface layer Z is smaller than porosity P1 of surface layer X and porosity P2 of inside Y. Surface layer Z may have a portion in which a ratio P3/P1 of porosity P3 to porosity P1 satisfies less than 1. P3/P1 may be less than or equal to 0.8 or less than or equal to 0.5. In any portion of surface layer Z, P3/P1 may satisfy less than 1.

Further, in a case where at least a part of the corner portion has a curved surface, a curvature of the curved surface may range, for example, from 0.002 (1/μm) to 0.05 (1/μm), inclusive, and more preferably from 0.005 (1/μm) to 0.02 (1/μm), inclusive.

Note that the curvature and the porosity are obtained by image analysis of a cross-sectional photograph of the anode body in a predetermined region. The cross section is captured with a scanning electron microscope (SEM), and image processing such as binarization of the captured image is performed in a field of view of, for example, 5 μm×10 μm to distinguish between the pore portion and the other portion. The porosity can be obtained as an area ratio of the pore portion occupying in a total area of the pore portion and the other portion. It is desirable that the captured image is measured at any 10 locations, and the porosity is obtained as an average value of area ratios of pore portions obtained at 10 locations. Porosity P1 (porosity P3) is obtained from the area ratio of the pore portion in region A in surface layer X (surface layer Z). Similarly, porosity P2 is obtained from the area ratio of the pore portion in region B in inside Y. The curvature of the corner portion is also calculated by capturing a photograph of the anode body from a side of a certain principal surface and performing image analysis on a contour shape near the obtained corner portion (vertex).

The densification of the surface layer of the anode body can be performed, for example, by placing the anode base material before sintering or before the formation of the dielectric layer after sintering in a container together with a vibrating member such as media particles and vibrating the container as will be described later. The principal surface of the anode base material collides with the vibrating member due to vibration, and the surface layer portion of the principal surface is formed denser than the inside by compression due to the collision. Here, molding of obtaining the anode base material before the formation of the dielectric layer by compression-molding a powder of valve metal particles in a rectangular parallelepiped shape in a state of being embedded in a compression-molding machine using a mold is referred to as primary molding, and molding of the above-described densification is referred to as secondary molding.

At this time, the vibrating member collides with not only the principal surface of the anode base material but also the corner portion. Since the corner portion has low mechanical strength, the corner portion is likely to be compressed by collision. Hence, the corner portion can be compressed by collision, and the corner portion can be formed in a curved surface shape. Denseness of surface layer Z at the corner portion is higher (porosity is lower) than denseness of surface layer X and inside Y of the principal surface.

On the other hand, in a case where the anode base materials are directly collided with each other without providing the vibrating member, only the corner portion of the anode base material collides with the principal surface of another anode base material. As a result, cracking may occur due to impact. Further, it takes a long time to densify the principal surface, and as a result, a variation in a degree of densification increase. Thus, variations in characteristics of the electrolytic capacitor increase. Further, cracking of the anode base material is likely to occur. In contrast, the vibrating member is collided with the anode base material, and thus, the cracking of the anode base material is suppressed. As a result, the principal surface of the anode base material can be uniformly densified in a short time.

FIG. 1 is a schematic perspective view illustrating an example of the anode body (or the anode base material) used in the electrolytic capacitor of the present exemplary embodiment. As shown in FIG. 1, anode body 1 has a substantially rectangular parallelepiped shape, and six principal surfaces 101A to 101F are exposed. Note that, since 101D to 101F are at positions hidden from the paper surface, 101D to 101F are not illustrated.

In principal surfaces 101A to 101F, a connection surface may be formed by taking a corner of the side portion near a side where two adjacent principal surfaces intersect. In the example of FIG. 1, connection surface 102C is interposed between principal surfaces 101A and 101B, connection surface 102A is interposed between principal surfaces 101B and 101C, and connection surface 102B is interposed between principal surfaces 101A and 101C. Further, near a vertex where three principal surfaces intersect, a second connection surface is formed by taking a corner of the vertex portion. In the example of FIG. 1, second connection surface 103A is provided at a vertex portion where principal surfaces 101A to 101C intersect. Second connection surface 103A connects connection surfaces 102A to 102C to each other. Connection surfaces 102A to 102C and second connection surface 103A are formed into rounded curved surfaces. Connection surfaces 102A to 102C and second connection surface 103A may have curved surfaces, or may include one or a plurality of planes (for example, corner portions may be chamfered).

Note that FIG. 1 shows an example of the shape of the anode body, the anode base material before the anodizing treatment similarly has a substantially rectangular parallelepiped shape, six principal surfaces 101A to 101F are exposed, the corners of the side portion and the vertex portion connecting the principal surfaces are removed, and the anode base material is machined into a rounded aspect.

In principal surfaces 101A to 101F, at least a part of the surface layer is formed denser than the inside. Hence, the surfaces of principal surfaces 101A to 101F have less irregularities, and the mechanical strength of the anode base material and the anode body is enhanced. Accordingly, a dielectric layer with few defects is formed on the surface of anode body 1. As a result, the leakage current can be reduced. Further, the damage of the dielectric layer is suppressed, the increase in the leakage current due to the damage of the dielectric layer is suppressed, and the leakage current can be maintained small.

Further, the anode base material has an outer shape in which corner portions are chamfered or curved, and thus, a dielectric layer having few defects can also be formed at the corner portions. As a result, an effect of reducing the leakage current can be enhanced. In addition, the mechanical strength of the corner portion of the brittle and fragile anode body is enhanced, and the concentration of thermal stress is alleviated. Accordingly, an effect of suppressing the increase in the leakage current due to the damage of the dielectric layer is enhanced, and the leakage current can be maintained smaller.

The surface layer of connection surfaces 102A to 102C and/or second connection surface 103A may be formed denser than the surface layer of porous principal surfaces 101A to 101F. That is, porosity P3 in the surface layer of connection surfaces 102A to 102C and/or second connection surface 103A may be smaller than porosity P2 in anode body 1, and may be smaller than porosity P1 in the surface layer of principal surfaces 101A to 101F.

Anode wire 2 extends from principal surface 101B of anode body 1. Anode body 1 and anode wire 2 constitute anode part 6.

Figure 2:
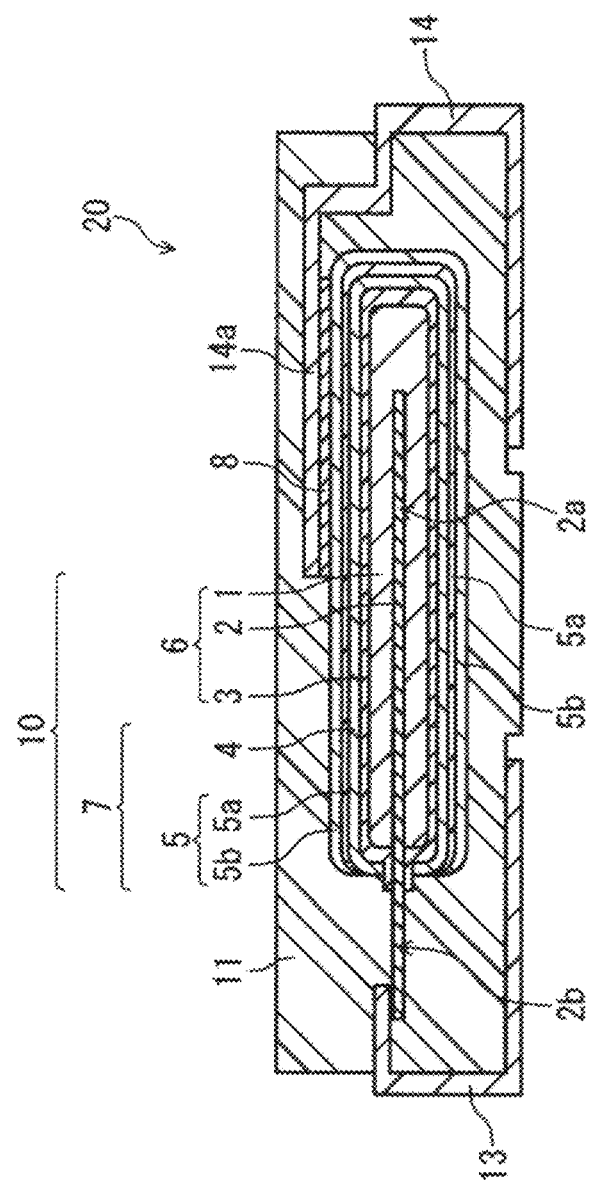
FIG. 2 is a cross-sectional view schematically illustrating the electrolytic capacitor according to the exemplary embodiment of the present disclosure.

Hereinafter, a configuration of the electrolytic capacitor according to the present exemplary embodiment will be appropriately described with reference to the drawings. However, the present disclosure is not limited thereto. FIG. 2 is a schematic cross-sectional view illustrating the electrolytic capacitor according to the present exemplary embodiment.

Electrolytic capacitor 20 includes capacitor element 10 including anode part 6 and cathode part 7, exterior body 11 sealing capacitor element 10, anode lead terminal 13 electrically connected to anode part 6 and partially exposed from exterior body 11, and cathode lead terminal 14 electrically connected to cathode part 7 and partially exposed from exterior body 11. Anode part 6 includes anode body 1 and anode wire 2. Anode body 1 includes dielectric layer 3 formed on a surface thereof. Cathode part 7 includes solid electrolyte layer 4 that at least partially covers dielectric layer 3, and cathode layer 5 that covers a surface of solid electrolyte layer 4.

<Capacitor element>

Hereinafter, capacitor element 10 will be described in detail by exemplifying a case where a solid electrolyte layer is provided as an electrolyte.

Anode part 6 includes anode body 1 and anode wire 2 extending from a surface of anode body 1 and electrically connected to anode lead terminal 13.

For example, anode body 1 is a porous sintered body having a rectangular parallelepiped shape and obtained by sintering metal particles. As the metal particles, particles of valve metal such as titanium (Ti), tantalum (Ta), and niobium (Nb) are used. One type or two or more types of metal particles are used for anode body 1. The metal particles may also be an alloy made of two or more types of metal. For example, an alloy containing the valve metal, and silicon, vanadium, boron, and the like may be used. Meanwhile, a compound containing the valve metal and a typical element such as nitrogen may be used. The alloy of the valve metal contains the valve metal as a main component and contains, for example, the valve metal in an amount of 50 atom % or more.

Anode wire 2 is made of a conductive material. The material of anode wire 2 is not particularly limited, and includes, for example, copper, aluminum, and an aluminum alloy in addition to the valve metal described above. The types of materials that respectively constitute anode body 1 and anode wire 2 may be identical to or different from each other. Anode wire 2 includes first portion 2a embedded in anode body 1 from the surface of anode body 1 and second portion 2b extending from the surface described above of anode body 1. A cross-sectional shape of anode wire 2 is not particularly limited, and includes, for example, a circular shape, a track shape (a shape formed of straight lines parallel to each other and two curves that connect ends of these straight lines), an ellipse, a rectangular shape, and a polygon.

Anode part 6 is produced, for example, by being compression-molded into a rectangular parallelepiped shape while first portion 2a is embedded in the powder of the metal particles described above, and sintered. Accordingly, second portion 2b of anode wire 2 is drawn out from the surface of anode body 1 to be planted. Second portion 2b is joined with anode lead terminal 13 by welding or the like, and anode wire 2 and anode lead terminal 13 are electrically connected to each other. A method for welding is not particularly limited, and examples include resistance welding and laser welding. Thereafter, machining of forming a curved surface can be performed on the corner portion of the rectangular parallelepiped.

Dielectric layer 3 is formed on the surface of anode body 1. For example, dielectric layer 3 is made of metal oxide. A method for forming a layer containing metal oxide on the surface of anode body 1 includes, for example, a method for immersing anode body 1 in an anodizing solution to anodize the surface of anode body 1, and a method for heating anode body 1 under the atmosphere containing oxygen. Dielectric layer 3 is not limited to a layer including the above metal oxide, and only need to have insulation properties.

(Cathode Part)

Cathode part 7 includes solid electrolyte layer 4 and cathode layer 5 covering solid electrolyte layer 4. Solid electrolyte layer 4 is formed to cover at least a part of dielectric layer 3.

As solid electrolyte layer 4, for example, a manganese compound or a conductive polymer is used. Examples of the conductive polymer include polypyrrole, polythiophene, polyfuran, polyaniline, and polyacetylene. These polymers may be used alone or in combination of a plurality of polymers. In addition, the conductive polymer may be a copolymer of two or more types of monomers. The conductive polymer may be polythiophene, polyaniline, or polypyrrole in terms of superiority in electric conductivity. In particular, the conductive polymer may be polypyrrole in terms of superiority in water-repellency.

Solid electrolyte layer 4 containing the above conductive polymer is formed by, for example, polymerizing a raw material monomer on dielectric layer 3. Alternatively, solid electrolyte layer 4 is formed by applying liquid containing the above conductive polymer to dielectric layer 3. Solid electrolyte layer 4 is formed of one layer or two or more layers of solid electrolyte layers. In the case where solid electrolyte layer 4 is formed of two or more layers, a composition, a forming method (polymerization method), or the like of the conductive polymer used for each layer may be different from each other.

Note that, in the present specification, polypyrrole, polythiophene, polyfuran, polyaniline, and the like mean polymers having, as a basic skeleton, polypyrrole, polythiophene, polyfuran, polyaniline, and the like, respectively. Thus, polypyrrole, polythiophene, polyfuran, polyaniline, and the like each can also include its derivative. For example, polythiophene includes poly(3,4-ethylenedioxythiophene) and the like.

In order to improve electric conductivity of the conductive polymer, various dopants may be added to polymerization liquid for forming a conductive polymer, a conductive polymer solution, or a dispersion liquid. The dopant is not particularly limited, and examples thereof include naphthalenesulfonic acid, p-toluenesulfonic acid, and polystyrenesulfonic acid.

In a case where the conductive polymer is dispersed in a dispersion medium in a particulate form, an average particle diameter D50 of the particles is, for example, between 0.01 µm and 0.5 µm, inclusive. When average particle diameter D50 of the particles is in this range, the particles are likely to enter the inside of anode body 1.

Cathode layer 5 includes, for example, carbon layer 5a formed to cover solid electrolyte layer 4 and metal paste layer 5b formed on a surface of carbon layer 5a. Carbon layer 5a contains a conductive carbon material such as graphite and resin. Metal paste layer 5b contains, for example, metal particles (for example, silver) and resin. Note that cathode layer 5 is not limited to this configuration. The configuration of cathode layer 5 only needs to have a current collecting function.

<Anode Lead Terminal>

Anode lead terminal 13 is electrically connected to anode body 1 via second portion 2b of anode wire 2. A material for anode lead terminal 13 is not particularly limited as long as the material is electrochemically and chemically stable and has electric conductivity. For example, anode lead terminal 13 may be metal such as copper or nonmetal. A shape of anode lead terminal 13 is not particularly limited as long as the shape is a flat plate. A thickness of anode lead terminal 13 (distance between principal surfaces of anode lead terminal 13) may be between 25 µm and 200 µm, inclusive, or may be between 25 μm and 100 μm, inclusive, from a viewpoint of having a low height.

One end of anode lead terminal 13 may be joined with anode wire 2 via a conductive adhesive material or solder or may be joined with anode wire 2 by resistance welding or laser welding. The other end of anode lead terminal 13 is led out to an outside of exterior body 11, and is exposed from exterior body 11. The conductive adhesive material is, for example, a mixture of a thermosetting resin described later and carbon particles or metal particles.

<Cathode Lead Terminal>

Cathode lead terminal 14 is electrically connected to cathode part 7 in joint 14a. Joint 14a is a portion that overlaps with cathode layer 5 of cathode lead terminal 14 when cathode layer 5 and cathode lead terminal 14 joined with cathode layer 5 are viewed from a normal direction of cathode layer 5.

Cathode lead terminal 14 is joined with cathode layer 5 via, for example, conductive adhesive material 8. One end of cathode lead terminal 14 forms, for example, a part of joint 14a, and is disposed inside exterior body 11. The other end of cathode lead terminal 14 is led out to the outside. Thus, a part including the other end of cathode lead terminal 14 is exposed from exterior body 11.

A material for cathode lead terminal 14 is not particularly limited as long as the material is electrochemically and chemically stable and has electric conductivity. For example, cathode lead terminal 14 may be metal such as copper or nonmetal. A shape of cathode lead terminal 14 is also not particularly limited, and for example, is a long and flat plate shape. A thickness of cathode lead terminal 14 may be between 25 μm and 200 μm, inclusive, or may between 25 μm and 100 μm, inclusive, from a viewpoint of having a low height.

<Exterior Body>

Exterior body 11 is provided to electrically insulate anode lead terminal 13 and cathode lead terminal 14, and is made of an insulating material (exterior body material). The exterior body material contains, for example, a thermosetting resin. Examples of the thermosetting resin include, for example, an epoxy resin, phenol resin, silicone resin, melamine resin, urea resin, alkyd resin, polyurethane, polyimide, unsaturated polyester, and others.

<<Method for producing electrolytic capacitor>>

Hereinafter, an example of a method for producing an electrolytic capacitor according to the present exemplary embodiment will be described.

A method for producing an electrolytic capacitor is a method for producing a solid electrolytic capacitor including a capacitor element. The capacitor element includes a porous anode body including an anode base body and a dielectric layer formed on a surface of the anode base body, and a solid electrolyte layer covering at least a part of the dielectric layer. The method includes a step of preparing an anode base material including a bound body of metal powder, a step of sintering the anode base material, a step of obtaining an anode body including the anode base body and the dielectric layer by performing an anodizing treatment on the anode base material after sintering, and a step of covering at least a part of the dielectric layer with the solid electrolyte layer. The anode base material has a plurality of principal surfaces. The method further includes a densification step of increasing a density of at least a partial region of at least one of the plurality of principal surfaces of the anode base material.

(1) Step of Preparing Anode Base Material

First, an anode base material as a base material for producing anode body 1 is prepared. A porous body can be used as the anode base material. In this case, the valve metal particles and anode wire 2 are inserted in a mold such that first portion 2a is embedded in the valve metal particles, and compression-molding is performed to obtain an anode base material including a bound body of the valve metal particles. A pressure during compression-molding is not particularly limited. The valve metal particles may be mixed with a binder such as polyacrylic carbonate, as necessary.

The valve metal particles are usually compression-molded by using a mold having a rectangular parallelepiped internal space and is sintered (secondary molding). In this case, the anode base material before sintering has a plurality of principal surfaces corresponding to a rectangular parallelepiped. Further, a shape of the anode base material after sintering is also a rectangular parallelepiped, and has a plurality of principal surfaces. In this case, the plurality of principal surfaces are directly connected to each other to form sides and vertices, and usually, a corner portion which is a side portion and/or a vertex portion connecting the plurality of principal surfaces is in a state where a tip portion is pointed, and has a shape having no curved surface.

Densification (high densification) of the principal surface of the anode base material can be performed on the anode base material after compression-molding. In the densification step, for example, the densification (high densification) of the principal surface of the anode base material is performed by causing media particles to collide with the principal surface. Preferably, the densification may be performed by vibrating the anode base material together with the media particles. More specifically, the densification can be performed by placing the anode base material on a container or a pedestal together with the media particles and vibrating the container or the pedestal in an up-and-down direction and/or a right-and-left direction. With the vibration of the container or the pedestal, the anode base material and the media particles vibrate, and the collision between the anode base material and the media particles is promoted. The media particles collide with the principal surface of the anode base material, and thus, the surface layer of the principal surface of the anode base material is compressed and formed at a high density.

In addition to colliding with the principal surface of the anode base material, the media particles can also collide with the corner portions (side portions and vertex portions) connecting the principal surfaces of the anode base material. As a result, in addition to the principal surface of the anode base material, the corner portions can be compressed to form the curved surface, and at least a part of the corner portions can be formed at a higher density than the densified region of the principal surface.

The pedestal (or a bottom of the container) may be a sieve. A coefficient of static friction is appropriately small, and the movement of the media particles and the collision of the media particles with the anode base material are likely to be induced. Most of the surface layer of the anode base material is compressed by the collision with the media particles. When the pedestal is the sieve, since the anode wire is less likely to directly collide with the pedestal, a risk of bending the anode wire can be reduced. An aperture of the sieve may be less than a minimum value of an external dimension of the anode base material such that the anode base material does not fall through an opening of the sieve. The aperture of the sieve may be greater than or equal to 1 mm, or may be between 2 mm and 3.4 mm, inclusive. When the aperture is greater than or equal to 1 mm, a variation in a curvature at the corner portion is likely to be reduced to a certain value or less.

The anode body may be vibrated together with the media particles by applying an external force to the media particles in a state where the anode base material is placed on the media particles. More specifically, for example, the anode base material may be mixed with the media particles, the anode base material may be put into a shaker together with the media particles, and the shaker may be operated. The shaker is preferably capable of applying vibration in a vertical direction in addition to a horizontal direction. In contrast, even though the anode base material and the media particles are put into a rotary barrel, since the vibration is not applied to the anode base material and the media particles, an effect of densifying the principal surface of the anode base material is hardly obtained. Although the rotation of the anode base material and the media particles can induce the collision of the media particles with the anode base material, it takes a long time to densify the principal surface, and it is difficult to densify the principal surface uniformly. In addition, since the anode base material and the media particles are pushed up along with the rotation of the barrel, the impact when the anode base material and the media particles fall is large, and cracking and chipping of the anode base material are likely to occur.

A density of the media particles may be between 0.15 times and 0.4 times, inclusive, the density (true density) of the anode base material. In a case where the density of the media particles is in the above range, the energy due to the collision of the media particles can be efficiently utilized for the compressive deformation of the anode base material.

Alumina particles, zirconia particles, and the like can be used as the media particles. A particle size (average particle size) of the media particles may be less than or equal to ⅓ or less than or equal to ⅕ of a maximum dimension of the anode body. In this case, the media particles are more likely to collide with the principal surface than the corner portion of the anode base material, and the principal surface of the anode base material is more likely to be uniformly compressed by the collision. Note that the maximum dimension of the anode body refers to a maximum Feret's diameter of the anode body excluding the anode wire, and in a case where the anode body is the rectangular parallelepiped, the maximum dimension of the anode body refers to a length of a longest side. The particle size (average particle size) of the media particles is, for example, between 0.1 mm and 3 mm, inclusive, and may be between 0.5 mm and 2 mm, inclusive.

In a case where the alumina particles are used as the media particles, when the anode base material is made of a valve metal (for example, tantalum) other than aluminum, the media particles collide with the anode base material, and thus, alumina derived from the media particles may adhere to the anode base material in a small amount. An anodizing treatment is performed on the anode base material to which the alumina adheres, and thus, the anode body may include a dielectric layer containing aluminum oxide. When the amount of aluminum oxide contained in the dielectric layer is small, an action of improving an insulating property of the dielectric layer, improving a withstand voltage, and reducing the leakage current. However, when the amount of aluminum oxide contained in the dielectric layer is excessive, a plurality of materials having different dielectric constants are contained in the dielectric layer, and thus, a decrease in capacitance may be caused. The amount of alumina adhering to the anode base material can be controlled to an appropriate amount depending on a frequency of vibration, the particle size of the media particles, a mixing ratio between the anode base material and the media particles to be put into the container, a time for colliding the media particles, and the like.

At least a part of the surface of the media particles may be coated with metal identical to a constituent metal of the metal powder of the anode base material in advance. Here, the constituent metal means not impurities contained in the anode base material but main components. Accordingly, when the media particles collide with the anode base material, the adhesion of metals (or metal compounds) other than the valve metal constituting the anode body to the anode base material is suppressed. For example, in a case where the alumina particles are used as the media particles, the adhesion of alumina to the surface of the anode base material is suppressed. The surface of the media particles can be coated by a known method. However, when the media particles (for example, alumina particles) collide with the anode base material, alumina derived from the media particles adheres to the anode base material, while the constituent metal of the anode base material adheres to the surface of the media particles. As a result, the surface of the media particles can be coated with metal identical to the constituent metal of the anode base material. By doing this, media particles whose surfaces are coated with metal identical to the constituent metal of the anode base material may be used.

As described above, in the method for vibrating the anode base material together with the media particles and causing the anode base material to collide with the media particles, the surface layer of the principal surface of the anode base material can be efficiently compressed, and the principal surface can be densified.

In contrast, in a case where the anode base materials are directly collided with each other without the medium particles interposed therebetween, only the corner portion of the anode base material collide with the principal surface of another anode base material. As a result, cracking is likely to occur due to impact. In particular, since a weight of another anode base material is added to the anode base material positioned at a bottom of the container, cracking or chipping is likely to occur. In addition, the anode wire provided on the anode base material may collide with another anode base material, and the anode wire may be bent. In addition, since it takes a long time to densify the principal surface, a variation in denseness in the principal surface also increases, and it is difficult to compress the principal surface of the anode base material at a uniform density. As described above, in a case where the media particles are not used, the productivity of the anode body is likely to decrease.

The media particles are caused to collide with the anode base material, and thus, the surface layer of the principal surface of the anode base material can be easily compressed via the media particles to be densely formed. Thus, the principal surface of the anode body can be densified at a uniform density in a short time. In addition, the occurrence of bending of the anode wire is also suppressed.

(2) Sintering Step

Thereafter, the anode base material is sintered. The sintering is preferably performed under a reduced pressure. First portion 2a of the anode wire is embedded in the porous sintered body from the surface thereof.

The porous sintered body after sintering may be densified. However, since the bonding between the metal particles is not strong and the anode base material is likely to be compressed, the densification step is preferably performed on the compression-molded anode base material before sintering. In a case where the anode base material that is the porous sintered body after sintering is densified, the densification can be performed similarly to the densification of the anode base material before sintering.

In a case where the metal powder is pressure-molded to obtain the anode base material, metal fine particles adhere to the principal surface of the anode base material regardless of whether the anode base material is before or after sintering, and the anode base material is often not flat but has a shape having irregularities as viewed microscopically. However, when the dielectric layer is formed, since the dielectric layer is formed to cover the entire surface of the fine particles, the metal fine particles adhering to the principal surface do not contribute to the capacitance. In the densification step, the surface layer of the anode base material is compressed together with the metal fine particles, and thus, the dielectric layer formed on the surface of the fine particles can also contribute to the capacitance. As a result, the capacitance is improved.

(3) Step of Obtaining Anode Body (Anodizing Treatment Step)

Next, an anodizing treatment is performed on the anode base material after sintering to obtain porous anode body 1 including the anode base body and the dielectric layer formed on the surface of the anode base body. Specifically, anodization is performed by immersing the anode base material in an anodizing tank filled with an electrolyte solution (for example, phosphoric acid aqueous solution) and connecting second portion 2b of anode wire 2 to the anode body in the anodizing tank, and thus, dielectric layer 3 formed of an oxide film of a valve metal can be formed on the surface of the porous part. The electrolytic aqueous solution is not limited to the phosphoric acid aqueous solution, and nitric acid, acetic acid, sulfuric acid, or the like can be used. A non-anodized core portion of anode body 1 constitutes the anode base body.

Further, this anodizing treatment preferably includes a first anodizing step and a second anodizing step. In the first anodizing step, the dielectric layer is uniformly formed on the surface layer portion and the inside of the porous anode base body. In the second anodizing step, a dielectric layer thicker than the dielectric layer formed in the first anodizing step is formed on the surface layer portion of the porous anode body and near the surface layer. The second anodizing step is preferably performed after the first anodizing step. Note that a series of anodizing treatments including the first anodizing step and the second anodizing step is referred to as double anodization.

In the first anodizing step, for example, anodization is performed by immersing the anode base material in an electrolytic aqueous solution (for example, an aqueous phosphoric acid solution), and thus, dielectric layer 3 formed of an oxide film of a valve metal can be formed on the surface of the porous part.

In the second anodizing step, for example, anodization is performed by immersing the anode base material in an electrolytic aqueous solution (for example, sodium tetraborate), and thus, dielectric layer 3 formed of an oxide film of a valve metal can be formed on the surface of the porous part. An applied voltage for anodization in the second anodizing step is preferably higher than an applied voltage for anodization in the first anodizing step. An anodization time in the second anodizing step is preferably shorter than an anodization time in the first anodizing step.

Further, it is preferable that a thickness of the surface layer portion and the region near the surface layer portion of anode body 1 in which dielectric layer 3 is formed thick in the second anodizing step is larger than a thickness of the region densified by the secondary molding from a viewpoint of reduction of the leakage current of electrolytic capacitor 20, suppression of the occurrence of a short circuit failure, and improvement of withstand voltage characteristics.

The first anodizing step and the second anodizing step are executed, and thus, the density and mechanical strength of the surface layer portion and near the surface layer portion of anode body 1 can be increased. Accordingly, anode body 1 becomes strong against external stress, and as a result, the increase in the leakage current and the occurrence of the short circuit failure of electrolytic capacitor 20 are suppressed. Thus, the withstand voltage characteristics are improved.

The density and mechanical strength in the surface layer of anode body 1 can be evaluated by, for example, comparison of Vickers hardness. Table 1 is a table for comparing the Vickers hardness of anode body 1 according to whether or not the secondary molding and the double anodization are performed. The Vickers hardness is an average value of measurement results at any eight locations on the principal surface of anode body 1. As a result, anode body 1 on which the secondary molding and the double anodization have been performed had a highest Vickers hardness. That is, the secondary molding and the double anodization are performed, and thus, electrolytic capacitor 20 becomes strong against external stress. Accordingly, the increase in the leakage current and the occurrence of the short circuit failure can be suppressed, and the withstand voltage is improved.

TABLE 1

| Vickers hardness [HV] | 35.2 | 41.2 | 44.4 | 51.2 |
|---|---|---|---|---|
| Secondary molding | Not performed | Not performed | Performed | Performed |
| Double anodization | Not performed | Performed | Not performed | Performed |

(4) Step of Forming Solid Electrolyte Layer

Subsequently, at least a part of dielectric layer 3 is covered with solid electrolyte layer 4. Accordingly, capacitor element 10 is obtained.

Solid electrolyte layer 4 containing the conductive polymer is formed on at least a part of dielectric layer 3, for example, by a method for impregnating, with a monomer or an oligomer, anode body 1 on which dielectric layer 3 is formed and then polymerizing the monomer or the oligomer by chemical polymerization or electrolytic polymerization, or a method for impregnating, with a solution or a dispersion liquid of the conductive polymer, anode body 1 on which dielectric layer 3 is formed, and drying the anode body.

Solid electrolyte layer 4 can be formed, for example, by impregnating, with a dispersion liquid containing a conductive polymer, a binder, and a dispersion medium, anode body 1 on which dielectric layer 3 is formed, taking out the anode body, and drying the anode body. The dispersion liquid may contain a binder and/or conductive inorganic particles (for example, a conductive carbon material such as carbon black). In addition, the conductive polymer may contain a dopant. The conductive polymer and the dopant can be each selected from the materials exemplified for solid electrolyte layer 4. A known binder can be used as the binder. The dispersion liquid may contain a known additive agent used in forming the solid electrolyte layer.

Finally, cathode layer 5 formed of carbon layer 5a and metal paste layer 5b is formed by sequentially applying a carbon paste and a metal paste on the surface of solid electrolyte layer 4. Cathode layer 5 is not limited to this configuration and only need to have the current collecting function.

Subsequently, anode lead terminal 13 and cathode lead terminal 14 are prepared. Second portion 2b of anode wire 2 that is planted from anode body 1 is joined with anode lead terminal 13 by laser welding, resistance welding, or the like. In addition, after application of conductive adhesive material 8 to cathode layer 5, cathode lead terminal 14 is joined with cathode part 7 via conductive adhesive material 8.

Subsequently, a material (for example, an uncured thermosetting resin and a filler) of capacitor element 10 and exterior body 11 are accommodated in a mold, and capacitor element 10 is sealed by a transfer molding method, a compression molding method, or the like. At this time, a part of anode lead terminal 13 and cathode lead terminal 14 is exposed from the mold. Conditions of the molding are not particularly limited, and the conditions on time and temperature may be appropriately set in consideration of a temperature for curing the thermosetting resin to be used and the like.

Finally, the exposed portions of anode lead terminal 13 and cathode lead terminal 14 are bent along exterior body 11 to form a bent portion. Accordingly, a part of anode lead terminal 13 and cathode lead terminal 14 is disposed on a mounting surface of exterior body 11.

Electrolytic capacitor 20 is produced by the method described above.

Figure 3A:
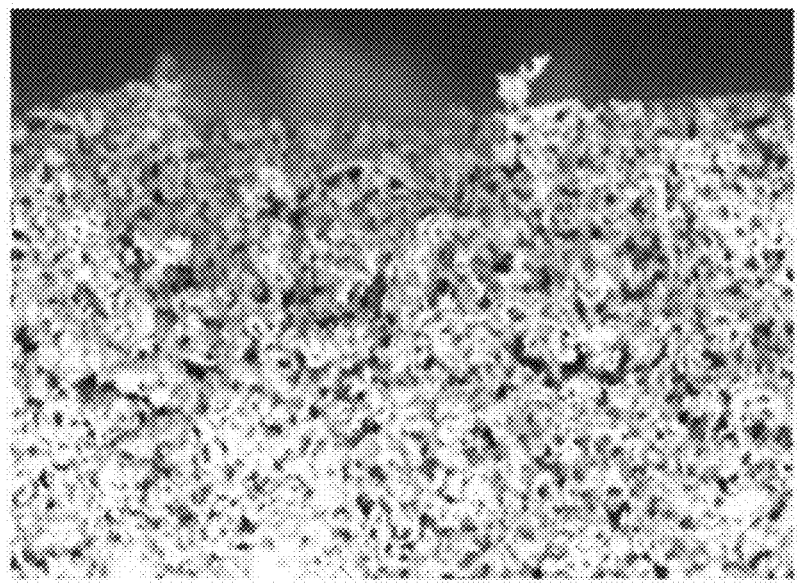
FIG. 3A is an electron micrograph of a surface of a principal surface of an anode base material before the principal surface of the anode base material is densified.
Figure 3B:
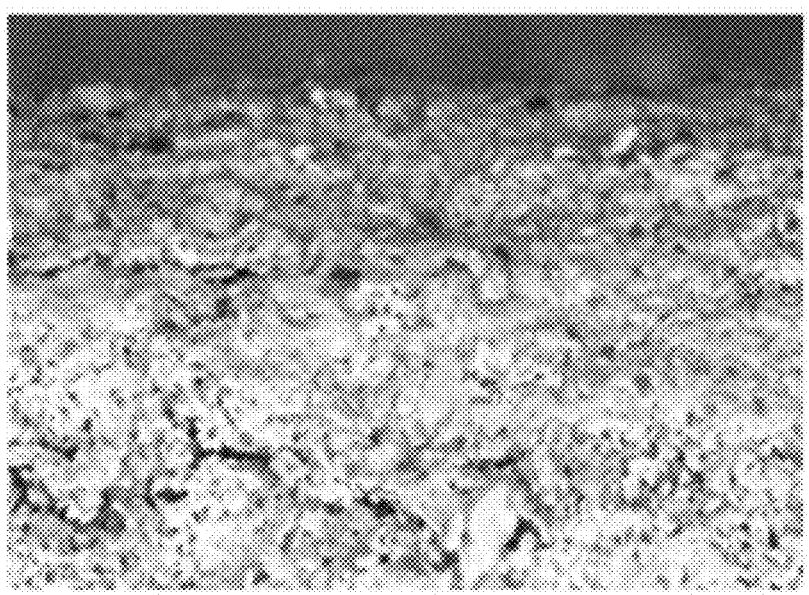
FIG. 3B is an electron micrograph of the surface of the principal surface of the anode base material after the principal surface of the anode base material is densified.

FIGS. 3A and 3B show electron micrographs of the surface of the principal surface of the anode base material in the production method of the present exemplary embodiment. A valve metal (Ta) is present in a white portion, and a black portion is a void (pore). FIG. 3A is a photograph before the densification step, and FIG. 3B is a photograph after the densification step. Note that FIGS. 3A and 3B are electron micrographs at an identical magnification. FIG. 3B shows a result of a case where, in the densification step, an anode base material before sintering (0.8 mm×3.7 mm×5.2 mm) in which an anode wire is embedded and having a substantially rectangular parallelepiped outer shape was put into a shaker together with alumina particles having an average particle size of 1 mm, and the shaker was operated. Cracking or chipping was not observed in any of the anode base materials, and the bending of the anode wire was not observed.

Figure 4A:
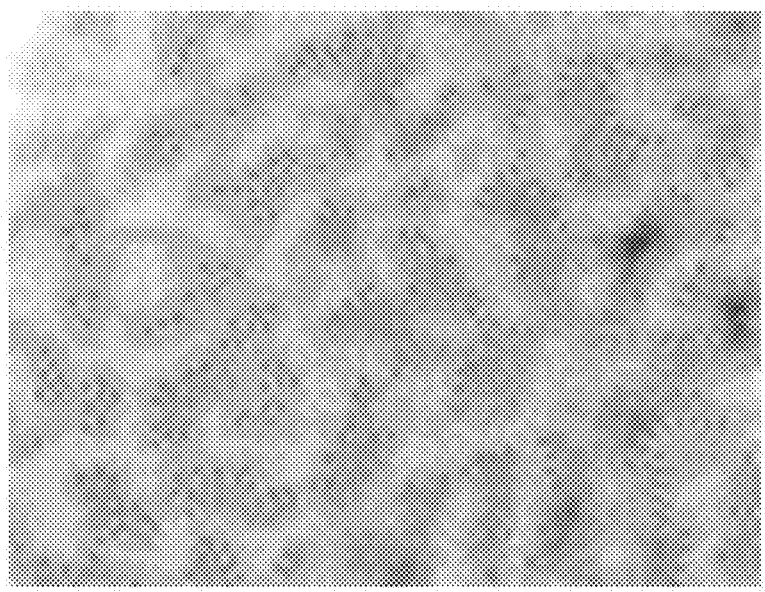
FIG. 4A is an electron micrograph of a cross section of the surface layer of the principal surface of the anode base material after the principal surface of the anode base material is densified.
Figure 4B:
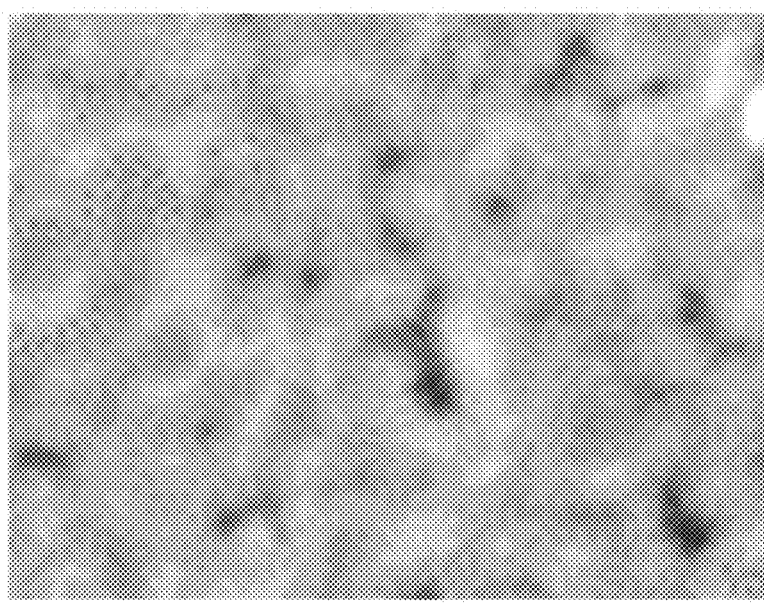
FIG. 4B is an electron micrograph of a cross section of an inside of the anode base material after the principal surface of the anode base material is densified.

FIGS. 4A and 4B show electron micrographs of a cross section of the anode base material after the densification step. FIG. 4A is a cross-sectional photograph of surface layer X of the principal surface of the anode base material, and FIG. 4B is a cross-sectional photograph of inside Y of the anode base material. Note that FIGS. 4A and 4B are electron micrographs at an identical magnification. As shown in FIG. 4A, surface layer X has fewer void portions than inside Y and is densified. In FIG. 4A, porosity P1 of surface layer X was calculated to be 0.016, and in FIG. 4B, porosity P2 of inside Y was calculated to be 0.057.

In contrast, the anode base material before sintering was put into a stainless steel container of φ 55 mm×55 mm, and a rotation treatment was performed at 150 rpm for 5 minutes on a ball mill rotation table. In this case, surface layer X was not densified, cracking or chipping was observed in 20% of the entire anode base material, and remarkable bending of the anode wire was confirmed in 0.7% of the entire anode base material. Note that when a rotation speed was less than 150 rpm, the anode base material slid on a container wall surface, and a uniform treatment was not performed.

In addition, an anode base material before sintering and alumina particles of φ 1 mm were put into a stainless steel container of φ 55 mm×55 mm, and a rotation treatment was performed at 80 rpm for 5 minutes on a ball mill rotating table. In this case, cracking or chipping was observed in 5% of the entire anode base material.

As described above, it is considered that, in a case where the rotation treatment was performed on the element before sintering in the container, a large force is locally applied between the corner portion of the anode base material and the container wall surface or the like, and cracking or chipping or bending of the anode wire is caused.

The present disclosure can be used for an electrolytic capacitor, and can be suitably used for an electrolytic capacitor using a porous body as an anode body.

What is claimed is:

1. An electrolytic capacitor comprising a capacitor element, the capacitor element including:
    an anode body that is porous, the anode body including an anode base body and a dielectric layer disposed on a surface of the anode base body, and
    a solid electrolyte layer that covers at least a part of the dielectric layer, wherein:
    the anode body includes a plurality of principal surfaces,
    the anode body includes a corner portion including a plurality of vertex portions and a plurality of side portions,
    each of the plurality of side portions connects two principal surfaces among the plurality of principal surfaces, and each of the plurality of vertex portions connects three principal surfaces among the plurality of principal surfaces,
    a first surface layer of at least one principal surface among the plurality of principal surfaces of the anode body is adjacent to a second surface layer of the corner portion,
    at least a part of the first surface layer of at least one principal surface of the plurality of principal surfaces of the anode body is denser than an inside of the anode body, and
    at least a part of the second surface layer of the corner portion is denser than the first surface layer and the inside of the anode body.

2. The electrolytic capacitor according to claim 1, wherein a porosity of the at least the part of the first surface layer is between 0.02 times and 0.7 times, inclusive, a porosity of the inside.

3. The electrolytic capacitor according to claim 1, wherein:
    the dielectric layer contains aluminum in a region where a depth from at least one principal surface of the plurality of principal surfaces of the anode body is less than 1 μm, and
    a content proportion of the aluminum in the dielectric layer in the region is in a range from 0.001 wt % to 10 wt %, inclusive.

4. The electrolytic capacitor according to claim 1, wherein at least a part of the corner portion has a curved shape or a chamfered shape.

5. The electrolytic capacitor according to claim 1, wherein the solid electrolyte layer contains a conductive polymer.

6. The electrolytic capacitor according to claim 1, wherein the anode base body is a sintered body of valve metal particles.

7. An electrolytic capacitor comprising a capacitor element, the capacitor element including:

an anode body that is porous, the anode body including an anode base body and a dielectric layer disposed on a surface of the anode base body, and a solid electrolyte layer that covers at least a part of the dielectric layer, wherein:

the anode body includes a plurality of principal surfaces, and at least a part of a first surface layer of at least one principal surface among the plurality of principal surfaces of the anode body is denser than an inside of the anode body, and the dielectric layer contains aluminum in a region where a depth from at least one principal surface of the plurality of principal surfaces of the anode body is less than 1 µm, and a content proportion of the aluminum in the dielectric layer in the region is in a range from 0.001 wt % to 10 wt %, inclusive.

8. The electrolytic capacitor according to claim 7, wherein a porosity of the at least the part of the first surface layer is between 0.02 times and 0.7 times, inclusive, a porosity of the inside.

9. The electrolytic capacitor according to claim 7, wherein:

the anode body includes a side portion connecting two principal surfaces among the plurality of principal surfaces and a vertex portion connecting three or more principal surfaces among the plurality of principal surfaces, the anode body further includes a corner portion including the vertex portion and a plurality of side portions each of which is the side portion, and at least a part of the corner portion has a curved shape or a chamfered shape.

10. The electrolytic capacitor according to claim 9, wherein at least a part of a second surface layer of the corner portion adjacent to the first surface layer is denser than the first surface layer and the inside.

11. An electrolytic capacitor comprising a capacitor element, the capacitor element including:

an anode body that is porous, the anode body including an anode base body and a dielectric layer disposed on a surface of the anode base body, a solid electrolyte layer that covers at least a part of the dielectric layer, and an anode wire including a first portion embedded in the anode body, wherein:

the anode body includes a plurality of principal surfaces, the first portion extends into an inside of the anode body from one principal surface among the plurality of principal surfaces, at least a part of a first surface layer of two principal surfaces among the plurality of principal surfaces of the anode body is denser than the inside of the anode body, the two principal surfaces including the one principal surface among the plurality of principal surfaces, the anode body includes a side portion connecting two principal surfaces among the plurality of principal surfaces and a vertex portion connecting three or more principal surfaces among the plurality of principal surfaces, the anode body further includes a corner portion including the vertex portion and a plurality of side portions each of which is the side portion, and at least a part of a second surface layer of the corner portion adjacent to the first surface layer is denser than the first surface layer and the inside.

12. The electrolytic capacitor according to claim 11, wherein the two principal surfaces among the plurality of principal surfaces of the anode body face each other.

13. The electrolytic capacitor according to claim 11, wherein at least a part of a first surface layer of all principal surfaces among the plurality of principal surfaces of the anode body is denser than the inside of the anode body.

14. The electrolytic capacitor according to claim 11, wherein a porosity of the at least the part of the first surface layer is between 0.02 times and 0.7 times, inclusive, a porosity of the inside.

15. The electrolytic capacitor according to claim 11, wherein:

the dielectric layer contains aluminum in a region where a depth from at least one principal surface of the plurality of principal surfaces of the anode body is less than 1 µm, and a content proportion of the aluminum in the dielectric layer in the region is in a range from 0.001 wt % to 10 wt %, inclusive.

16. The electrolytic capacitor according to claim 11, wherein:

at least a part of the corner portion has a curved shape or a chamfered shape.

* * * * *